United States Patent [19]
Kühn et al.

[11] Patent Number: 5,207,804
[45] Date of Patent: May 4, 1993

[54] MULTI-COMPONENT MIXTURES OF BRIGHT RED DISPERSE AZO DYESTUFFS

[75] Inventors: Reinhard Kühn, Frankfurt am Main; Margareta Boos, Hattersheim am Main; Rudolf Binder, München; Klaus Hofmann, Frankfurt am Main, all of Fed. Rep. of Germany

[73] Assignee: Hoechst Aktiengesellschaft, Frankfurt am Main, Fed. Rep. of Germany

[21] Appl. No.: 838,702

[22] PCT Filed: Sep. 4, 1990

[86] PCT No.: PCT/EP90/01480

§ 371 Date: Apr. 20, 1992

§ 102(e) Date: Apr. 20, 1992

[87] PCT Pub. No.: WO91/04302

PCT Pub. Date: Apr. 4, 1991

[30] Foreign Application Priority Data

Sep. 12, 1989 [DE] Fed. Rep. of Germany ....... 3930393

[51] Int. Cl.$^5$ .......... C09B 7/10; C09B 67/22; D06P 1/18; D06P 3/84
[52] U.S. Cl. ............................. 8/639; 8/155; 8/529; 8/532; 8/640; 8/650; 8/922
[58] Field of Search ................... 8/639, 640

[56] References Cited

U.S. PATENT DOCUMENTS

| 4,115,055 | 9/1978 | Kirner et al. | 8/639 |
| 4,231,918 | 11/1980 | Babler | 524/84 |
| 4,620,853 | 11/1986 | Tappe et al. | 8/639 |

FOREIGN PATENT DOCUMENTS

1063155 3/1967 United Kingdom .

*Primary Examiner*—A. Lionel Clingman

[57] ABSTRACT

Coupling products of diazotized o- or p-toluidines to 3-hydroxy-2-naphthoic acid p-anisidide do not produce optimum dyeing properties in HT exhaustion dyeing of wound packages of synthetic fiber materials. Filtration occurs time after time under critical conditions, since these single dyestuffs and also mixtures of these with one another build up too slowly in the heating-up phase.

A bright red multi-component system of the same color shade, which exhibits a significantly improved exhaustion capacity by synergism during HT dyeing of wound packages and no longer presents difficulties in respect of filtration, can be obtained by mixing monoazo dyestuffs which are obtained by coupling diazotized aniline and p-toluidine in each case to 3-hydroxy-2-naphthoic acid p-anisidide.

10 Claims, No Drawings

MULTI-COMPONENT MIXTURES OF BRIGHT RED DISPERSE AZO DYESTUFFS

DESCRIPTION

The present invention relates to dyestuff preparations in the form of a multi-component mixture of bright red disperse azo dyestuffs and their use for dyeing synthetic fibers.

Dyeing of synthetic fiber materials with disperse dyestuffs by exhaustion from an aqueous medium using HT dyeing conditions at temperatures between 105° and 140° C. is general prior art and is practiced on an industrial scale.

Disperse dyestuffs are by nature water-insoluble chemical compounds which contain no solubility-conferring grouping in the molecule. As organic color pigments, they are usually employed from an aqueous dispersion in colloidal form for dyeing hydrophobic synthetic fibers, such as, for example, 2½ acetate, triacetate, polyamide or polyester fiber types, and for this purpose they first have to be brought into an absorbable, appropriately standardized fine dispersion by means of a so-called finish, advantageously under the co-influence of nonionic or anionic dispersing agents and, if appropriate, other auxiliaries. Without such a pre-treatment or such additives, it would not be possible to achieve a stain-free and even dyeing of the substrate.

However, as the expert in the field of operation mentioned knows, there are difficulties in the case of dyeing with bright red color shades inasmuch as on the one hand the number of single dyestuffs having the desired shading capacity is very limited, and in addition all the individual dyestuffs suitable for this purpose have the disadvantage that when used for high temperature dyeing of wound packages, that is to say chiefly for cheeses and warp beams, under critical conditions—even with the best possible finish—they often tend towards filtration and therefore to dyeings which are not fast to rubbing. The build-up of such single dyestuffs in the heating-up phase, which is critical for the result of the dyeings, is also usually too slow and therefore unsatisfactory because for this reason dyeing temperatures which extend to the upper limit of the tolerance for the dyestuff and fiber and long dyeing times always become necessary.

The coloring agents in question on the basis of the inadequacies discussed in respect of the dyeing results which can be achieved are, above all, the disperse dyestuffs of the type C.I. Disperse Red 200, C.I. Disperse Red 151 and the like.

In view of the state of affairs described above, the object was thus to develop bright red disperse dyestuffs having faultless process characteristics in respect of dyeing properties, build-up and dispersion stability for the production of standard and combination dyeings on synthetic fibers by the exhaustion technique under high temperature (HT) conditions, and of realizing this aim using high-performance combinations based on two or three specifically selected red disperse dyestuffs. The aspect that filtration of non-fixed dyestuff on the goods must be avoided without fail was also essential, especially in view of the use of the coloring agents in question in the dyeing of wound packages.

According to the invention, the solution to the object aimed at/by the expert has now been found in that the disadvantages mentioned for red single dyestuffs of the abovementioned type in HT exhaustion dyeing of, in particular. PES fibers can be avoided by planned use of a combination of the azo compounds described below.

The present invention accordingly relates to dyestuff preparations in the form of a multi-component mixture of red disperse azo dyestuffs, which consist of 80 to 20 parts by weight, preferably 70 to 25 parts by weight, of the dyestuff of the formula I

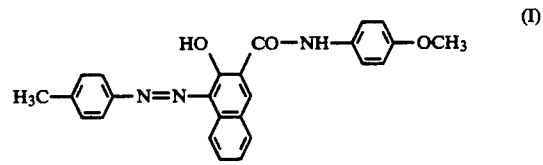

and 20 to 80 parts by weight, preferably 25 to 70 parts by weight, of the dyestuff of the formula II

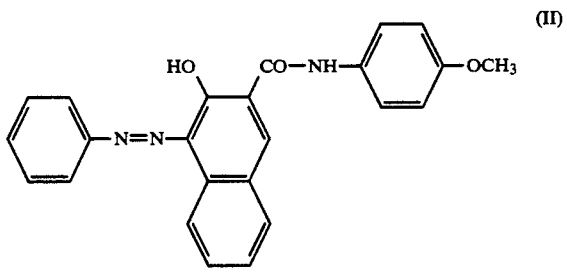

and, as the shading component, 0 to 20 parts by weight, preferably 5 to 15 parts by weight, of the dyestuff C.I. Vat Red 41 having the C.I. No. 73300 and corresponding to the formula III

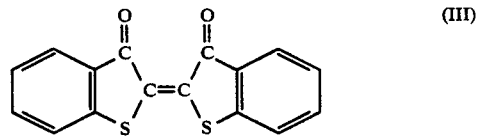

or contain these dyestuffs, with the proviso that the sum of the proportions of the single dyestuffs on which the mixture is based in each case makes up a total weight of the preparation of 100 parts by weight and (in the case of commercial products) is based on the content of pure dyestuff.

The dyestuff mixtures according to the invention contain or consist in principle of the two monoazo dyestuffs of the formulae I and II. In addition to these basic constituents, on which the abovementioned weight ratios are based, they can moreover also include conventional standardizing agents and/or auxiliaries and, if appropriate, also other dyestuffs, such as, for example, the vat dyestuff of the formula III.

However, the achievement of the inventive idea defined above was in no way obvious. In view of the doctrine of the relevant prior art, in fact, it was not to be assumed that providing a mixture of primarily azo compounds of the formulae I and II in the ranges of amounts claimed for producing bright red HT exhaustion dyeings on synthetic fibers would lead to results which fulfil all the requirements in respect of build-up and even dyeing capacity and dispersion stability in the aqueous liquor to the optimum.

A finding qualified to this extent was not to be expected because of the known exhaustion properties of the single dyestuffs under HT conditions, especially since chiefly the component of the formula I taken by itself—even with the best finish—reveals the deficiencies objected to. The red azo compound of the formula I, which is classified as problematical as a result of such experiences, contains p-toluidine as the diazo component. If this constituent of the formula I in the dyestuff preparation claimed is now combined with the isomeric dyestuff which contains o-toluidine as the diazo component and the same coupling component (European Patent 0,185,207), a red isomer mixture which likewise has adverse properties during HT exhaustion dyeing of wound packages. Under these circumstances, it was thus all the more astonishing that the dyestuff mixture according to the invention containing the component of the formula II which includes unsubstituted aniline as the diazo component and differs from the two azo compounds previously discussed merely by the absence of the $CH_3$ group in the ortho- or para-position, produces utilizable results because of a synergistic effect. As has been confirmed by experimental studies, it has thus been found, surprisingly, that mixtures of several of these single dyestuffs have synergistic characteristics in affinity behavior only if quite particular structural features exist, whereas mixtures of other dyestuffs do not achieve a better affinity behavior than the corresponding single dyestuffs.

The component of the formula III optionally present in the dyestuff preparations serves exclusively for certain shading possibilities so that commercially available red single dyestuffs can be replaced, remaining largely faithful to the color shade, without changing the recipe.

For the manufacture of the preparations according to the invention, it is meanwhile unimportant whether the individual dyestuffs on which they are based are combined as dyestuffs which are already in the final finished form (which otherwise prove to be largely inadequate when used as a single component for the intended purpose), or whether they are exposed to the influence of a finishing process together as a pre-finished mixture. However, the preparations claimed can also be obtained by diazotizing a combination of p-toluidine and aniline in a weight ratio of (80 to 20):(20 to 80), preferably (70 to 25):(25 to 70) and then coupling the diazotization product to the coupling component 3-hydroxy-2-naphthoic acid p-anisidide, after which the multi-component mixture of the individual dyestuffs of the formulae I and II produced in this way by mixed coupling or any mixed crystals formed therefrom is subjected to a customary finish treatment, if appropriate with participation of the dyestuff of the formula III, and to standardization. These circumstances just described give an indication that it is not any particular finish, but a synergism which is responsible for the advantageous effect achieved.

Dyestuff preparations which have the features according to the invention and are present in the form of a fine dispersion (in the state ready for dyeing) which results, for example, from grinding by means of dispersing agent(s), are outstandingly suitable for exhaustion dyeing of known synthetic fibers by themselves or as a constituent of mixtures containing such synthetic fibers and natural fibers or regenerated fibers under high-temperature conditions (105°-140° C.) of the aqueous dyeing medium. According to the present invention, they are employed as a disperse red dyestuff for achieving, above all, bright red standardized color shades on the synthetic fibers or on the synthetic fiber component of fiber mixtures, or also combination color shades. The present invention at the same time furthermore relates to a dyeing process of the type mentioned and the use of the novel dyestuff preparations on the basis mentioned.

Synthetic fiber goods which can be colored by means of the dyestuff preparations described according to the invention by their structure are primarily hydrophobic polyester fibers based on polyethylene terephthalate, polybutylene terephthalate or polycyclohexylene terephthalate, and also fibers which are derived from copolymers of such PES.

The present invention can be used in principle for dyeing the abovementioned fiber materials in various states of processing, for example as flocks, slubbings, yarn or piece goods.

Dyeing of synthetic fibers or mixtures thereof using the dyestuff mixtures according to the invention is carried out by the conventional high-temperature (HT) exhaustion method at temperatures between 105° and 140° C. The actual dyeing is advantageously followed by reductive purification or after-treatment, assisted by dispersing agents, of the dyed goods for the removal of dyestuff portions which are not completely fixed.

The following embodiment example is intended to demonstrate the effect which can be achieved by the invention without limiting it, above all in respect of the mixing ratios stated.

EXAMPLE

A cheese of polyester filament weighing 300 g is dyed on a dyeing apparatus equipped for the treatment of wound packages using an aqueous dispersion which contains—based on the weight of the dry goods—2.5% of a mixture of already-finished dyestuffs in the commercially available form composed of 60 parts by weight of the dyestuff of the formula I 28 parts by weight of the dyestuff of the formula II and 12 parts by weight of the dyestuff of the formula III the pH of which has first been adjusted to 5, in a liquor ratio of 1:15 under an alternating liquor circulation direction at 135° C. for 90 minutes.

Reductive after-purification customary in practice is carried out for finishing the yarn dyeing.

A bright red dyeing of the goods which is fast to rubbing is obtained, without filtration of non-fixed dyestuffs.

COMPARISON

The above exhaustion dyeing was repeated under the same conditions, with the exception that instead of the dyestuff mixture, 2.5%—based on the weight of goods—of the dyestuff of the formula I in the finished, commercially available form was employed.

A dyeing of the yarn which has the same color shade but is not fast to rubbing and in many cases is unusable because of filtration of the dyestuff is obtained.

If the affinity properties of the particular coloring agent during the dyeing operation are now checked in the case of the dyeing test previously performed, a more uniform, coloristic build-up which starts earlier manifests itself in the example—compared with the comparison. Filter samples of aqueous liquors of the two dyestuff preparations show that the single dyestuff (Comparison) tends to produce undesirable deposits between layers of the wound material, whereas the dyestuff mixture (Example) proved to be perfectly good in this respect.

We claim:

1. A dyestuff preparation in the form of a multi-component mixture comprising red disperse azo dyestuffs, which comprises 80 to 20 parts by weight, of the dyestuff of the formula I

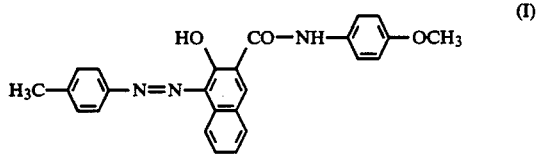

and 20 to 80 parts by weight, of the dyestuff of the formula II

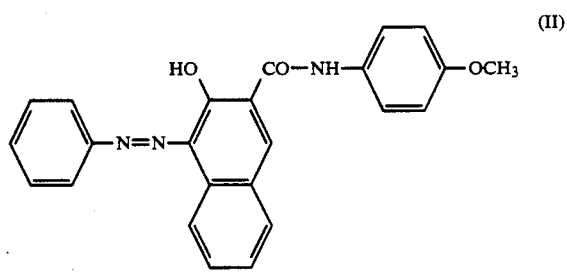

and, as the shading component, 0 to 20 parts by weight, of the dyestuff C.I. Vat Red 41 having the C.I. No. 73300 and corresponding to the formula III

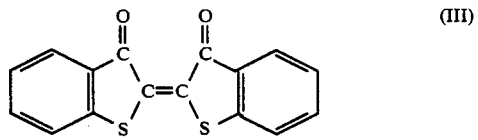

with the proviso that the sum of the proportions of the individual dyestuffs on which the mixture is based in each case makes up a total weight of the preparation of 100 parts by weight and is based on the content of pure dyestuff.

2. The dyestuff preparation as claimed in claim 1, in which the mixing ratio of the individual dyestuffs on which the mixture is based is 70 to 25 parts by weight of the dyestuff of the formula I, 25 to 70 parts by weight of the dyestuff of the formula II and 5 to 15 parts by weight of the dyestuff of the formula III, and at the same time the proviso formulated in that claim is complied with.

3. The dyestuff preparation according to claim 1, in which the mixture comprising the disperse dyestuffs of the formulae I and II and optionally of the vat dyestuff of the formula III is present in the form of a fine dispersion, in the state ready for disperse dyeing.

4. The dyestuff preparation as claimed in claim 3, obtainable by mixing the individual basic dyestuffs of the formulae I and II and optionally of the formula III, which have been separately completely finished and standardized beforehand, or by mixing the non-finished individual basic dyestuffs of the formulae I and II and optionally of the formula III and carrying out joint finishing and standardization subsequently or even during the mixing operation, or by finishing a multi7component mixture, obtained by joint azo coupling of the diazonium compounds of a combination of p-toluidine and aniline in a weight ratio of (80 to 20):(20 to 80) to 3-hydroxy-2-naphthoic acid p-anisidide, of the individual dyestuffs of the formulae I and II, or of any mixed crystal formed therefrom, and standardizing, optionally with participation of the dyestuff of the formula III.

5. A process for exhaustion dyeing of textile material comprising synthetic fibers alone or in combination with natural fibers or regenerated fibers or combinations of natural and regenerated fibers under high temperature (HT) conditions, which comprises dyeing said textile material with a dyestuff preparation as claimed in claim 1 as the disperse red dyestuff for standard and combination dyeings.

6. The process as claimed in claim 5, wherein wound packages are dyed by exhaustion at temperatures between 105° and 140° C.

7. A textile material comprising synthetic fibers, which has been dyed with a dyestuff preparation as claimed in claim 1.

8. A textile material comprising synthetic fibers, which has been dyed by a process as claimed in claim 5.

9. A textile material comprising synthetic fibers which has been dyed by a process as claimed in claim 6.

10. A dyestuff preparation as claimed in claim 4, wherein said combination of p-toluidine and aniline is in a weight ratio of (70 to 25):(25 to 70).

* * * * *

UNITED STATES PATENT AND TRADEMARK OFFICE
CERTIFICATE OF CORRECTION

PATENT NO.: 5,207,804

DATED: May 4, 1993

INVENTOR(S): Reinhard Kühn, Margareta Boos, Rudolf Binder and Klaus Hofmann

It is certified that error appears in the above-identified patent and that said Letters Patent is hereby corrected as shown below:

At column 2, line 1, "particular." should read --particular,--.

In claim 4, column 6, line 25, "multi7component" should be --multi-component--.

Signed and Sealed this

Fifteenth Day of March, 1994

*Attest:*

BRUCE LEHMAN

*Attesting Officer*    *Commissioner of Patents and Trademarks*